United States Patent [19]
Hurst

[11] Patent Number: 5,845,564
[45] Date of Patent: Dec. 8, 1998

[54] APPARATUS FOR IMPROVING HEAD RICE YIELD

[75] Inventor: William D. Hurst, Orlando, Fla.

[73] Assignee: MEI Research, Inc., Orlando, Fla.

[21] Appl. No.: 982,903

[22] Filed: Dec. 2, 1997

Related U.S. Application Data

[63] Continuation of Ser. No. 580,471, Dec. 28, 1995, Pat. No. 5,700,505.

[51] Int. Cl.⁶ .................................................. A23L 1/182
[52] U.S. Cl. .......................... 99/468; 99/323.1; 99/473; 99/485; 99/516
[58] Field of Search .......................... 99/467, 468, 471, 99/473–476, 477, 469, 485, 323.1, 516, 517, 534; 53/434, 512; 204/176; 241/8, 12; 422/26, 112, 186.05, 186.07, 186.12, 186.18; 426/312, 316, 320, 418, 419, 482, 483, 235, 236, 622, 462, 472; 554/10, 13, 14

[56] References Cited

U.S. PATENT DOCUMENTS

| | | |
|---|---|---|
| 57,838 | 9/1866 | Adams . |
| 277,768 | 5/1883 | Mitchell . |
| 1,215,254 | 2/1917 | Darden . |
| 1,267,204 | 5/1918 | Frick . |
| 2,339,507 | 1/1944 | Nagy et al. . |
| 2,379,677 | 7/1945 | Borsakovsky . |
| 2,867,256 | 1/1959 | Earle . |
| 3,089,527 | 5/1963 | Wasserman et al. . |
| 3,261,690 | 7/1966 | Wayne . |
| 3,552,297 | 1/1971 | Williams .................................. 99/468 |
| 3,897,210 | 7/1975 | Gruber et al. ......................... 99/474 X |
| 4,376,130 | 3/1983 | Astrack et al. . |
| 4,549,477 | 10/1985 | McCabe . |
| 5,004,587 | 4/1991 | Tacchi ................................. 422/186.07 |
| 5,089,098 | 2/1992 | Tacchi ...................................... 204/176 |
| 5,154,895 | 10/1992 | Moon ................................... 422/186.07 |
| 5,352,467 | 10/1994 | Mitchell et al. . |
| 5,405,631 | 4/1995 | Rosenthal ................................ 426/235 |
| 5,409,673 | 4/1995 | Mausgrover et al. ............. 422/186.07 |
| 5,503,809 | 4/1996 | Coate et al. ........................ 422/186.18 |
| 5,549,037 | 8/1996 | Stumphauzer et al. ................. 99/323.1 |
| 5,578,280 | 11/1996 | Kazi et al. .......................... 422/186.07 |
| 5,609,096 | 3/1997 | Kwon et al. ............................... 99/468 |
| 5,702,673 | 12/1997 | Kaji et al. ........................... 422/186.05 |
| 5,759,497 | 6/1998 | Kuzumoto et al. ................ 422/186.07 |

FOREIGN PATENT DOCUMENTS

| | | |
|---|---|---|
| 2069149 | 3/1990 | Japan . |
| 21971 | 7/1989 | United Kingdom . |

OTHER PUBLICATIONS

The Ozonolysis of Philippine Unsaturated Oils, V.P. Arida, F.C. Porlaza and W.J. Schmitt, excerpted from the *The Philippine Journal of Science*, pp. 249, 252, 1967.

Installation Instructions for the Hydrozone™ 800, Marschand Enterprises, Inc., *Owner's Manual for the Hydro–800*, Mar. 1995.

Ozone Monitor Installation—Model HC–12, PCI Ozone & Control Systems, Inc., *Ozone Monitor Operating and Instruction Manual—Model HC–NEMA 12*, No Date Given.

*Primary Examiner*—Timothy F. Simone
*Attorney, Agent, or Firm*—Allen, Dyer, Doppelt, Milbrath & Gilchrist, P.A.

[57] ABSTRACT

Dehulled brown unmilled rice is exposed to ozone gas in an ozone and air gas mixture. The exposed brown rice is stored for at least a day to sufficiently affect the bran before subjecting the exposed rice to a typical milling process. The milling of the exposed brown rice results in reduced breakage and thus increased head rice yield to economically attractive levels.

26 Claims, 3 Drawing Sheets

APPARATUS FOR IMPROVING HEAD RICE YIELD

This is a continuation of application Ser. No. 08/580,471 filed Dec. 28, 1995.

BACKGROUND OF INVENTION

1. Field of Invention

The invention relates generally to methods of processing grains for improving yield from milling, and more particularly to an ozone pre-milling treatment of brown rice for reducing breakage and thus enhancing the head rice yield.

2. Background Art

Rice is one of the world's most important food crops with billions of pounds of rough rice produced in the United States alone each year. A grain of rice has a rough outer hull or shell that is not good to eat. The kernel within this fairly loose covering is surrounded by a series of brownish skins or layers referred to as the bran coat or coats. This coat contains most of the vitamins and minerals. The bran coat sticks closely to the kernel. Humans typically eat the hard starchy kernels. Farmers throughout the world cultivate thousands of varieties of rice. The dried, threshed grain, still enclosed in its hull, is called rough rice. Typically the farmers sell the rough rice to shellers or millers, who remove the hulls and bran with successive milling operations to produce the polished rice which we eat. Brown rice results from the dehulling of the rough rice kernel. Head rice results from the milling of the brown rice. Since milled whole kernels, commonly known as head rice, are worth much more than broken kernels, the reduction in breakage in milling is of great economic importance. It has been shown that a one percent increase in head rice yield provides a significant increase in production value and thus potentially millions of dollars per percentage increase in extra earnings for the United States alone.

The main concern in rice milling is, in fact, head rice yield. However, another important and related aspect of milling quality lies in the degree of milling, which is a measure of the amount of bran remaining on the milled kernels. Current milling includes the mechanical removal of the bran layers by either a kernel to kernel friction process or by abrasion of kernels against a stone surface. Various processes and studies have been employed to improve head rice yield using the well known milling standards.

By way of example, U.S. Pat. No. 3,089,527 to Wasserman et al. discloses a process for increasing milling yields of rice to obtain increased amounts of head rice yield and total rice from a given weight of rough rice. The rice is exposed to heated air for an interval, then stored to permit equilibration of moisture content, then again subjected to drying, again stored, and so on to bring the rice to a desired moisture content with minimum damage to the rice. U.S. Pat. No. 3,261,690 to Wayne discloses the extractive milling of brown rice in the presence of an organic solvent. The process comprises milling bran from brown rice in the presence of a solvent effective to extract fatty components from the rice and germ. Further, investigation of alternative milling techniques aimed at reducing or totally eliminating the amount of physical milling required to reach a specified degree of milling are currently ongoing at the University of Arkansas under the direction of T.J. Siebenmorgan.

It is also known to use ozone in the treatment of foods and food products. U.S. Pat. No. 1,267,204 to Frick discloses a method of deodorizing grains including exposing the grain to be treated to the action of ozone and steam which removes disagreeable odors so that the grain is fit to be eaten by animals. U.S. Pat. No. 2,379,677 discloses a method of milling grain wherein ozone is used as a sterilizing treatment after the loose bran has been separated. As described in U.S. Pat. No. 4,376,130 to Astrack et al, the ozonolysis of whole seeds is performed for the bleaching of seed pods to an off-white color. The treatment is economical and leaves no adverse effect upon taste or aroma of the seeds treated.

While the focus of the present invention is to improving head rice yield from the milling of brown rice, the stripping of epidermal material from certain grains in general is anticipated. As described in U.S. Pat. No. 2,867,256 to Earle, the principal cereal grains used for human food such as wheat, rye, brown rice and oats are characterized by laminate bran coats in close enveloping relation with the kernel or starchy endosperm of each individual grain. By way of example, the bran coat of the various grain varieties will differ as to number, individual character, and particular interrelation of their constituent laminations. The bran coat of wheat characteristically consists of six separate recognizable laminations where the outermost is devoid of food value and expediently separable from the underlying laminations. The inner bran coat layers carry nutritional properties and are not adapted to be readily parted from one another. In the case of brown rice, the multi-layer bran coat reacts progressively and rather uniformly to the appropriate techniques of complete detachment from the associated endosperm to condition the latter for use in a conditional form. The Earle '256 patent discloses a method of stripping the epidermal material from grains with moisture conditioning and time tempering of the material for a subsequent epidermal reaction to the pressures and frictions of grain migration. As the moisture penetrates the epidermis, the film of binding material thereunder becomes soft and loosens its adhesive qualities to an extent that permits a separation of the epidermis from the epicarp through moderate friction of the grain berries one against the other, or between surfaces moving at varying speeds and controlled pressures, such as in the conventional rice cones, under pressure much less than will fracture the berries. The present invention seeks to provide a simple and economical pretreatment for use prior to conventional milling methods.

SUMMARY OF INVENTION

It is an object of the present invention to provide a pretreatment of grains which increases milling yields. It is a primary object of the present invention to improve head rice yield from the milling of brown rice. A further object of the invention is to provide an efficient method for exposing dehulled or brown rice to ozone in preparation of the brown rice for milling. It is yet another object of the invention to pretreat rice prior to milling such that rice bran layers are sufficiently affected for making the brown rice easier to mill thus reducing breakage and increasing head rice yield. It is yet another object of the invention to expose the brown rice to minimal yet sufficient ozone doses for significantly improving the rice yield after limited storage of the exposed brown rice. It is further an object of the invention to expose the brown rice in an economic pre-milling process for improving head rice yield without altering milling processes well known in the art.

In the present invention, a method for milling rice comprises exposing brown rice to ozone, storing the exposed rice for delaying the time between exposure and milling, and milling bran from kernels of the brown rice with sufficient pressure to remove a desired amount of bran layers. The ozone is generated and supplied in an ozone and air mixture.

The exposure is monitored for limiting rice exposure to permit a substantial portion of brown rice to react with the ozone. Relatively small quantities of ozone gas are used to expose the brown rice yet sufficient to affect the rice prior to milling for permitting an interaction between the ozone and the brown rice and thus improve milling properties. Less breakage is observed and thus increased head rice yield after milling, the primary object of the present invention.

BRIEF DESCRIPTION OF DRAWINGS

A preferred embodiment of the invention as well as alternate embodiments are described by way of example with reference to the accompanying drawings in which.

DETAILED DESCRIPTION OF PREFERRED EMBODIMENT

Figure 1:
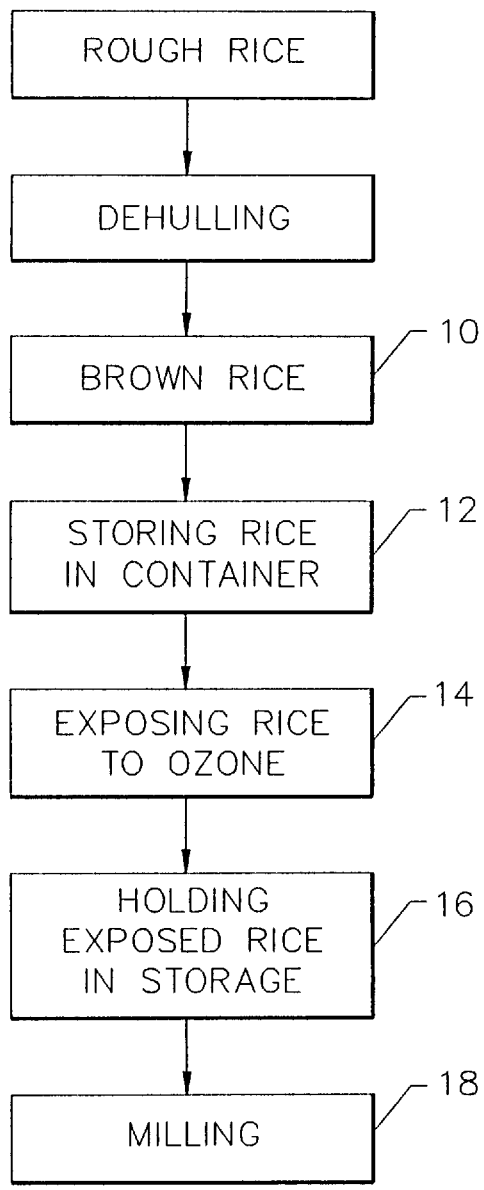
FIG. 1 is a functional flow diagram illustrating the ozone exposure of brown rice prior to the milling.

The preferred embodiment of the invention, a method for pretreatment of brown rice for improved head rice yield is illustrated with reference to FIG. 1. As shown, brown rice 10 is provided after dehulling of brown rice and placed within a storage container 12 in preparation for exposing the rice to ozone. The brown rice is exposed to a limited amount of the ozone 14 and held in a sealed storage facility 16 in order to permit the ozone to affect the brown rice for permitting the bran to be more readily removed during the milling. After storage for at least one day, the brown rice is milled 18 with the result being an increased head rice yield when compared to untreated rice. Results of tests performed revealed that milling the rice immediately after exposure to the ozone has no measurable and in some cases a detrimental effect on yield. Further, heavy exposure to ozone does not enhance yield. In fact, initial tests showed that light gas exposure and storage time to permit the ozone to react with the brown rice prior to milling results in a significant reduction in broken kernels to a level for significantly increasing head rice yield.

Figure 2:
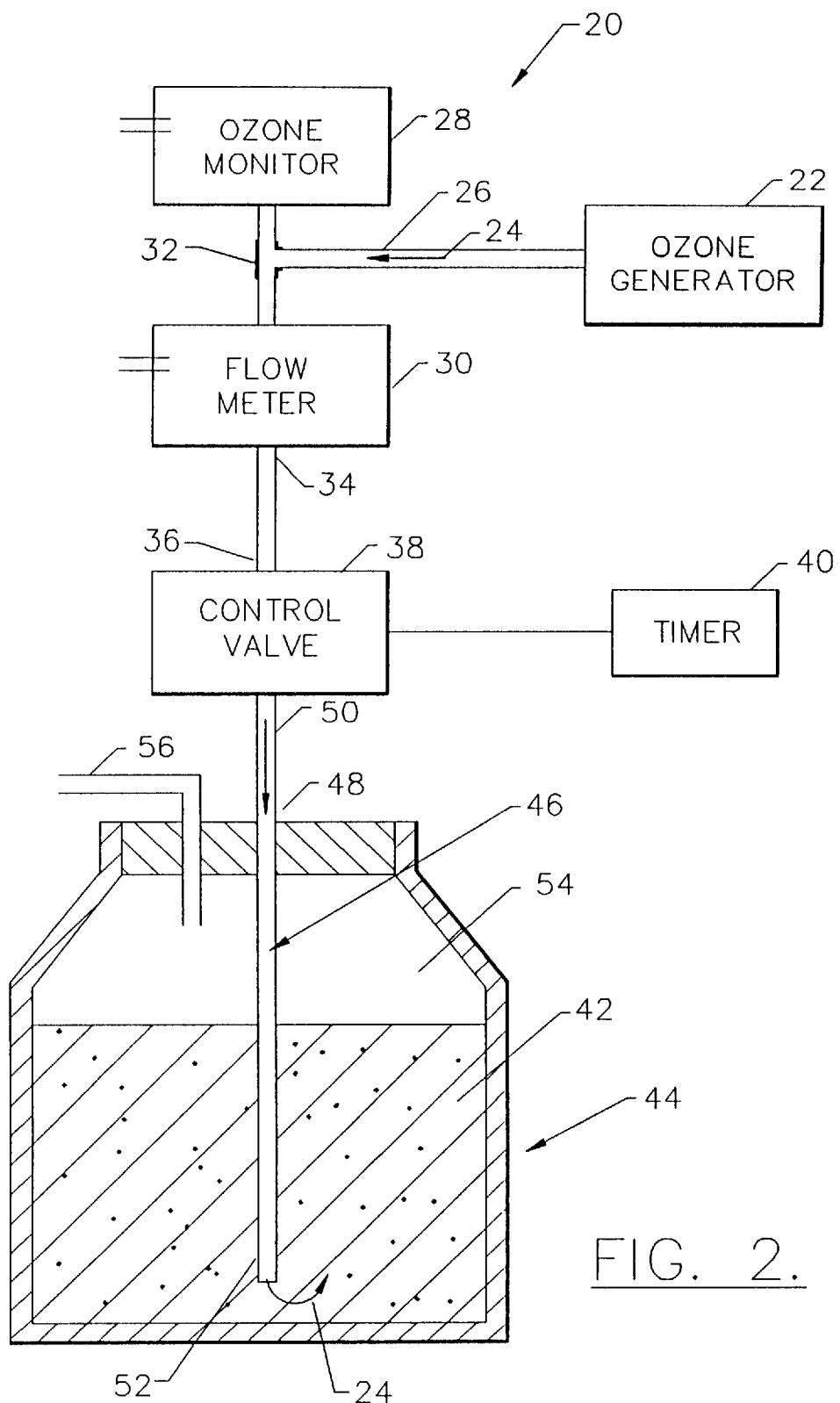
FIG. 2 is a partial schematic diagram illustrating apparatus used in performing the brown rice exposure.

The pretreatment of the brown rice was conducted using the apparatus 20 as illustrated with reference to FIG. 2. A pressurized ozone generator 22 by Hydrozone (TM), Model 800, manufactured and distributed by Marschand Enterprises, Inc., Orlando, Fla. is used to provide an air and ozone gas mixture 24. The gas mixture 24 is delivered through a conduit 26 to an ozone monitor 28 and through a flow meter 30 by diverting the mixture 24 through a T-connector 32. One output 34 of the flow meter 30 provides an input 36 to a solenoid valve 38. The valve 38 closure is controlled by a timer 40 and remains in the closed position until exposure of brown rice 42 is needed. The brown rice 42 is held within a container 44. The container 44 comprises an inlet tube 46 having an input end 48 communicating with a valve output 50. A tube output end 52 is positioned within the rice 42 at a bottom portion of the container 44. A container top portion 54, above the rice 42 has a vent 56 permitting the gas mixture 24 entering the container 44 to flow through and expose a substantial portion of the rice 42.

In operation, the generator 22 is placed in continuous operation while controlling the flow of gas 24 to the flow meter 30 such that a known amount of gas mixture 24 and thus ozone is injected into the rice 42 through the tube 46 by opening the valve 38 for a preset time period. The flow meter 30 used comprised a series of Dwyer (R) Flowmeters having sight flow indicators. The ozone monitor 28 was Model HC-NEMA 12 Ozone Monitor by PCI Ozone & Control Systems, Inc.

In the tests performed, 350 grams of brown rice 42 was consistently used. Approximately 1000 ppm of ozone in the gas mixture 24 was injected into the container 44 for a period of approximately 16 seconds as controlled by the timer 40 preset for this period. The rice 42 was at ambient room temperature of approximately 80 degrees Fahrenheit and maintained after exposure at approximately 36 degrees Fahrenheit during storage. Twenty five sample runs were made including exposed and unexposed rice in preparation for milling. The milling was performed from one day to twenty two days after exposure with the results showing a significant reduction in kernel breakage during milling from typically ten to thirty percent when compared to the unexposed samples. Milling within a time window of from three days to five days showed significant improvement. Further, the milling of each sample was performed at a consistent degree of milling. In all cases, the storage of the exposed rice showed reduced breakage and thus increased head rice yield when compared to unexposed brown rice and immediate milling of exposed rice.

Results further showed cycles of optimum milling windows. Tests continue on rice exposure and delay in milling for providing optimum and consistent head rice yield increases.

Figure 3:
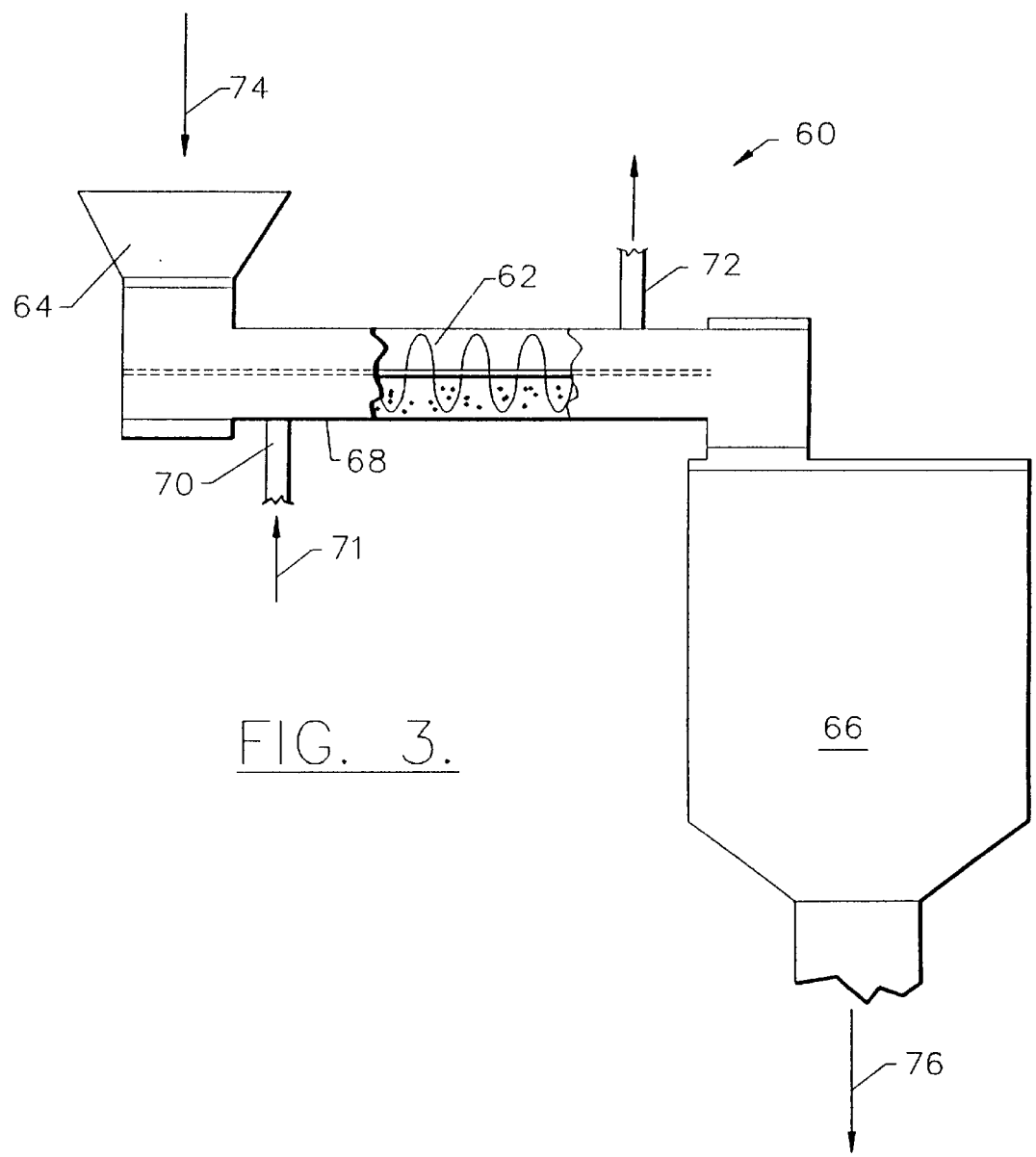
FIG. 3 is a partial schematic diagram illustrating an apparatus for exposing brown rice to ozone prior to the storage of the brown rice.

While it is anticipated that various combinations of apparatus elements typically used in the milling art will be incorporated, by way of example and with reference to FIG. 3, an exposure apparatus 60 in a preferred embodiment comprises a screw conveyor 62 having a first end communicating with a brown rice loading hopper 64 and a second end communicating with a brown rice storage hopper 66, wherein brown rice is conveyed from a loading hopper 64 through the screw conveyor 62 and into the storage hopper 66 for subsequent milling. The screw conveyor 62 operates within a conveyor housing 68. An ozone gas inlet 70 permits the ozone gas mixture 71 to flow within the conveyor housing 68 for exposing the brown rice 74 passing through the conveyor housing 68. A gas vent 72 communicates with the conveyor housing 68 for maintaining a fixed amount of ozone gas 71 within the conveyor housing 68. The screw conveyor 62 is operated at a constant speed for permitting brown rice 74 delivered to the loading hopper 64 to spend a predetermined amount of time within the conveyor housing 68 and thus be exposed to a fixed amount of ozone gas 71 during its travel from the conveyor hopper 64 through the screw conveyor 62 into the storage hopper 66. After being held in the storage hopper 66 for at least a day, the exposed brown rice is then ready for delivery 76 onto the well-known milling processes.

While a specific embodiment of the invention has been described in detail herein above, it is to be understood that various modifications may be made from the specific details described herein without departing from the spirit and scope of the invention as set forth in the appended claims.

Having now described the invention, the construction, the operation and use of preferred embodiments thereof, and the advantageous new and useful results obtained thereby, the new and useful constructions, methods of use and reasonable mechanical equivalents thereof obvious to those skilled in the art, are set forth in the appended claims.

What is claimed is:

1. An apparatus for pre-treating dehulled brown rice comprising:

storage means for storing dehulled brown rice, the storage means sufficient for containing an atmosphere of ozone gas greater than that found in ambient air;

ozone gas generation means for generating an atmosphere of ozone gas greater than that found in ambient air;

control means operable between the ozone gas generation means and the storage means for controlling a flow of the atmosphere of ozone gas into the storage means; and gas monitoring means for monitoring a quantity of the atmosphere of ozone gas exposing the dehulled brown rice.

2. The apparatus according to claim 1, further comprising a timer operable with the control means for limiting the flow of the atmosphere of ozone gas into the storage means.

3. The apparatus according to claim 1, further comprising venting means operable with the storage means for venting the atmosphere of ozone gas out of the storage means.

4. The apparatus according to claim 1, wherein the gas monitoring means comprises:

a flow meter operable between the control means and the ozone generation means; and an ozone monitor operable between the ozone gas generation means and the flow meter for monitoring an amount of ozone concentration in the atmosphere of ozone gas.

5. The apparatus according to claim 1, wherein the storage means comprises a conveyor for conveying the dehulled brown rice during exposure to the atmosphere of ozone gas, the conveyor useful in conveying the exposed dehulled brown rice to a storage hopper.

6. The apparatus according to claim 5, wherein the conveyor is a screw type conveyor operable within a housing of the storage means.

7. An apparatus for pre-treating dehulled brown rice comprising:

dehulled brown rice;

storage means for storing the dehulled brown rice, the storage means sufficient for containing an atmosphere of ozone gas greater than that found in ambient air; and ozone gas generation means operable with the storage means for generating an atmosphere of ozone gas greater than that found in ambient air within the storage means.

8. The apparatus according to claim 7 further comprising gas monitoring means for monitoring a quantity of the atmosphere of ozone gas within the storage means.

9. The apparatus according to claim 8, wherein the gas monitoring means comprises:

a flow meter operable between the control means and the ozone gas generation means; and an ozone monitor operable between the ozone generation means and the flow meter for monitoring an amount of ozone concentration in the atmosphere of ozone gas.

10. The apparatus according to claim 7, further comprising control means operable between the ozone generation means and the storage means for controlling a flow of the atmosphere of ozone gas into the storage means.

11. The apparatus according to claim 10, further comprising a timer operable with the control means for limiting the flow of the atmosphere of ozone gas into the storage means.

12. The apparatus according to claim 7, further comprising venting means operable with the storage means for venting the atmosphere of ozone gas out of the storage means.

13. The apparatus according to claim 7, wherein the storage means comprises a conveyor for conveying the dehulled brown rice during exposure to the atmosphere of ozone gas, the conveyor further conveying the exposed dehulled brown rice to a storage hopper).

14. The apparatus according to claim 13, wherein the conveyor is a screw type conveyor operable within a housing of the storage means.

15. An apparatus for pre-treating dehulled brown rice comprising:

a container for storing dehulled brown rice, the container sufficient for containing an atmosphere of ozone gas greater than that found in ambient air;

an ozone gas generator for generating an atmosphere of ozone gas greater than that found in ambient air;

a control valve operable between the ozone generator and the container for controlling a flow of the atmosphere of ozone gas into the container; and an ozone gas monitor for monitoring a quantity of ozone within the atmosphere of ozone gas.

16. The apparatus according to claim 15, further comprising a timer operable with the control valve for limiting the flow of the atmosphere of ozone gas into the storage means.

17. The apparatus according to claim 15, wherein the container includes a vent for venting the atmosphere of ozone gas out of the container.

18. The apparatus according to claim 15, wherein the ozone gas monitor comprises:

a flow meter operable between the control valve and the ozone gas generator; and an ozone gas monitor operable between the ozone gas generator and the flow meter for monitoring an amount of ozone gas concentration in the atmosphere of ozone gas.

19. The apparatus according to claim 15, wherein the container comprises a conveyor for conveying the dehulled brown rice to a storage hopper during exposure to the atmosphere of ozone gas.

20. An apparatus for pre-treating dehulled brown rice comprising:

dehulled brown rice;

a container for storing the dehulled brown rice, the container sufficient for containing an atmosphere of ozone gas greater than that found in ambient air; and an ozone gas generator operable with the container for generating an atmosphere of ozone gas greater than that found in ambient air within the container.

21. The apparatus according to claim 20, further comprising a gas monitor for monitoring a quantity of the atmosphere of ozone gas within the container.

22. The apparatus according to claim 21, wherein the gas monitor comprises:

a flow meter operable between the control means and the ozone gas generation means; and an ozone monitor operable between the ozone generation means and the flow meter for monitoring an amount of ozone concentration in the atmosphere of ozone gas.

23. The apparatus according to claim 20, further comprising a control valve operable between the ozone generator and the container for controlling a flow of the atmosphere of ozone gas into the container.

24. The apparatus according to claim 23, further comprising a timer operable with the control valve for limiting the flow of the atmosphere of ozone gas into the container.

25. The apparatus according to claim 20, wherein the container includes a vent for venting the atmosphere of ozone gas out of the container.

26. The apparatus according to claim 20, wherein the container comprises a conveyor for conveying the dehulled brown rice during exposure to the atmosphere of ozone gas, the conveyor useful in conveying the exposed dehulled brown rice to a storage hopper.

* * * * *